United States Patent [19]

Sharper

[11] Patent Number: 4,488,295
[45] Date of Patent: Dec. 11, 1984

[54] ALARM IMMUNE PROGRAM SIGNAL

[75] Inventor: Craig A. Sharper, Haverhill, Mass.

[73] Assignee: AT&T Bell Laboratories, Murray Hill, N.J.

[21] Appl. No.: 413,421

[22] Filed: Aug. 31, 1982

[51] Int. Cl.³ .............................................. H04J 15/00
[52] U.S. Cl. ............................... 370/99; 340/347 DD
[58] Field of Search ................... 370/99, 119; 375/25, 375/30, 34, 26; 340/347 DD; 381/31, 32

[56] References Cited

U.S. PATENT DOCUMENTS

| | | | |
|---|---|---|---|
| 3,970,799 | 7/1976 | Colton et al. | 370/102 |
| 3,988,545 | 10/1976 | Kuemmerle et al. | 370/99 |
| 4,205,203 | 5/1980 | Mehta et al. | 370/110.2 |

Primary Examiner—Douglas W. Olms
Assistant Examiner—Frank M. Scutch, III
Attorney, Agent, or Firm—Joseph A. Cameron

[57] ABSTRACT

An audio program signal is converted into 12-bit PCM words and two 12-bit words are inserted into three 8-bit time slots in a T1 line. To avoid interference from a "yellow" alarm in which the second bit positions of all of the 8-bit time slots are pre-empted, the three least significant bits are placed in the second, sixth and tenth bit positions of the 12-bit words, which alone can occupy the second bit position of the 8-bit time slots.

A translator for generating the 12-bit words from 14-bit linear PCM words is described. The six most significant bits of the 14-bit words address a ROM. Stored at each address in the ROM is a table of twelve instruction words. Each instruction word causes a selector switch to choose a bit of the output word from 1, 0 or an input bit. Bit order of the 12-bit words is therefore controlled by the order of instruction words in the tables of the ROM.

2 Claims, 4 Drawing Figures

ALARM IMMUNE PROGRAM SIGNAL

CROSS REFERENCE TO RELATED APPLICATIONS

The following applications, of common assignee and filed concurrently with this application disclose some of the same subject matter.

Gaunt-Giammusso 28-1 Broadband Transmission on Limited Bandwidth Digital Line Sharper-1 Digital Code Translator

BACKGROUND OF THE INVENTION

This invention relates to the field of digital transmission systems, more particularly to the transmission of audio program signals over T carrier.

The Gaunt et al. and Sharper applications mentioned above describe apparatus that is very useful for preparing an audio program signal for transmission over a T1 digital transmission line. Such a signal may carry, for example, a symphony concert from a concert hall to a radio transmitter for broadcast over FM stereo radio. According to the Gaunt-Giammusso application, the music signal could be sampled at a 32 kHz rate, the samples converted to a 12-bit compressed PCM code word and four 12-bit words inserted into six 8-bit time slots of a T1 line. To make efficient use of all twelve bits and insure timing recovery at the T1 repeaters, Gaunt et al. teaches a compressing characteristic of seven chords each represented in the 12-bit word by three centrally located chord bits comprising at least one "1". Such program channels may be carried on the same T1 line with ordinary voice signals.

T1 carrier, being designed primarily for telephone service, is a bidirectional system using a separate pair of wires for each direction. For maintenance purposes, when a fault occurs in one direction of transmission, a message to that effect is sent in the opposite direction. With most channel banks that terminate T1 lines, the form of that message, known as a "yellow" alarm, is a pre-emption of the second bit in each 8-bit time slot. Audio program signals, on the other hand, are generally unidirectional; a fault occurring in a T1 line in the direction toward the concert hall or studio would not affect the program signal. The "yellow" alarm, however, by pre-empting important information bits of each word, would have a devastating effect on the program signal.

An object of this invention is a system for preparing program signals for transmission over T carrier which renders a yellow alarm unnoticeable in the recovered program signal.

SUMMARY OF THE INVENTION

In an arrangement for transmitting a broadband signal over a multiplexed PCM transmission system having 8-bit time slots comprising encoding means for transforming the broadband signal into n-bit PCM words and inserting means for inserting m of said n-bit word into p of 8-bit time slots, bit order arranging means arrange the bit order of the n-bit words so that the second bit positions of the 8-bit time slots are occupied only by the least significant bits of the n-bit words. An audio program signal may be transformed into 12-bit words, the three least significant bits of which are in the second, sixth, and tenth bit positions.

DETAILED DESCRIPTION

Figure 1:
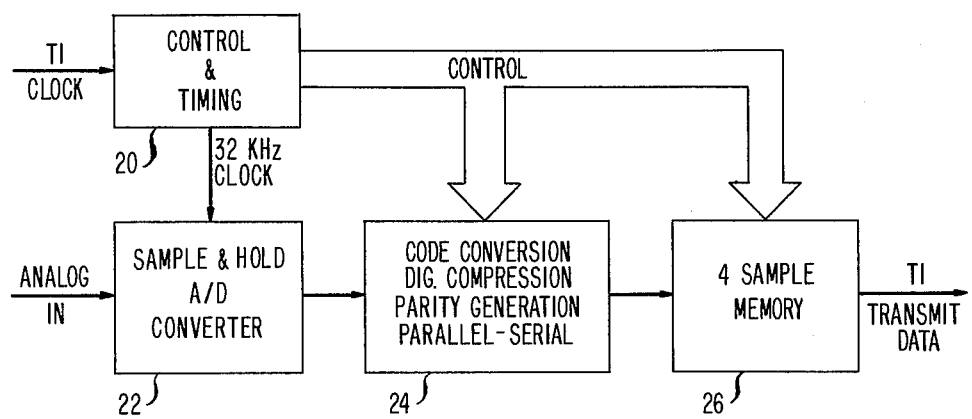
FIG. 1 is a block diagram of a system for inserting a broadband analog signal into a T carrier system, which may embody the invention.

To better explain the invention, we refer now to FIG. 1, which is a block diagram of an arrangement for preparing a broadband analog signal to use part of the capacity of a digital transmission system. In particular, it may be an arrangement for preparing a 15 kHz audio signal for transmission as part of the time-division-multiplexed signal of a T1 line.

In the arrangement of FIG. 1, a control and timing circuit 20 receives the 1.544 MHz clock from the T1 apparatus and generates therefrom various synchronized timing and control signals, including a 32 kHz clock signal. Sample-and-hold and analog-to-digital converter circuitry 22 samples the broadband analog signal at the 32 kHz rate, and encodes each sample, for example, into a 14-bit linear PCM word. Logic circuit 24 translates the code by compressing each 14-bit word into 11 bits, rearranges the bit order according to the invention, generates a parity bit to reflect the total number of 1's occurring over a predetermined number of bits in each compressed word and outputs each word one bit at a time. Memory 26 stores up to four 12-bit words and feeds them into six 8-bit time slots in each frame of the T1 line. In particular, in accordance with the invention, logic circuit 24 arranges the order of the bits in the 12-bit output words so that only the three least significant bits are pre-empted by the "yellow" alarm signal. The bit placement diagram of FIG. 2 shows this arrangement.

Figure 2:
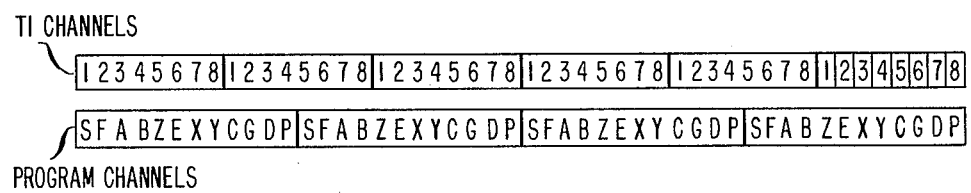
FIG. 2 is a bit placement diagram illustrating the correspondence between 12-bit words arranged according to the invention and T carrier 8-bit time slots.

To better understand the diagram of FIG. 2 consider a 12-bit PCM code word of the form S X Y Z A B C D E F G P. In this notation, S is the sign bit; X, Y and Z are the chord bits, designating linear sections of the compression characteristic; A through G are the step bits in order of decreasing significance; and P is a parity bit. According to the Gaunt-Giammusso invention, the combination of chord bits X, Y and Z always comprises at least one "1". For optimum effectiveness, the chord bits are placed within the central four bit positions of the 12-bit word. This provides sufficient pulse density of the signal when inserted into T1 time slots to insure timing recovery at the repeaters. According to the invention, each of bits E, F and G, the three least significant bits of the transmitted 12-bit word occupies one of the second, sixth or tenth bit positions. In the diagram of FIG. 2, bit F occupies the second bit position in each 12-bit word of the program channel, bit E the sixth and bit G the tenth. Above each program channel bit is shown the bit position of the T1 channel time slot that bit will occupy. It can be seen that the second bit position of each T1 time slot is occupied by only bits E, F or G. Hence, when that bit is pre-empted by a "yellow" alarm, eliminating the information carried by that bit from the program signal, the amount of detail lost is of the lowest significance; most listeners do not detect any deterioration of the quality of sound they hear.

Which of the three bits E, F or G occupies the respective second, sixth or tenth bit positions in the 12-bit word is not important. An alternative system, for example, could have bits E, F and G in the second, tenth and sixth bit positions respectively. Furthermore, this invention could be applied to other length words inserted into 8-bit time slots. For 16-bit words, for example, the two least significant bits would be in positions two and ten.

It will be recognized that implementation of my invention alone, being a matter of bit order in the transmitted word, can be accomplished by simple wire connections between registers in which the words appear in parallel form. A more advantageous mode, however, of practicing the invention in the context of an audio program signal, makes use of the digital code translator, subject of the Sharper-1 application. It can implement the instant invention while it is implementing the Gaunt et al. arrangement at no extra cost.

Figure 3:
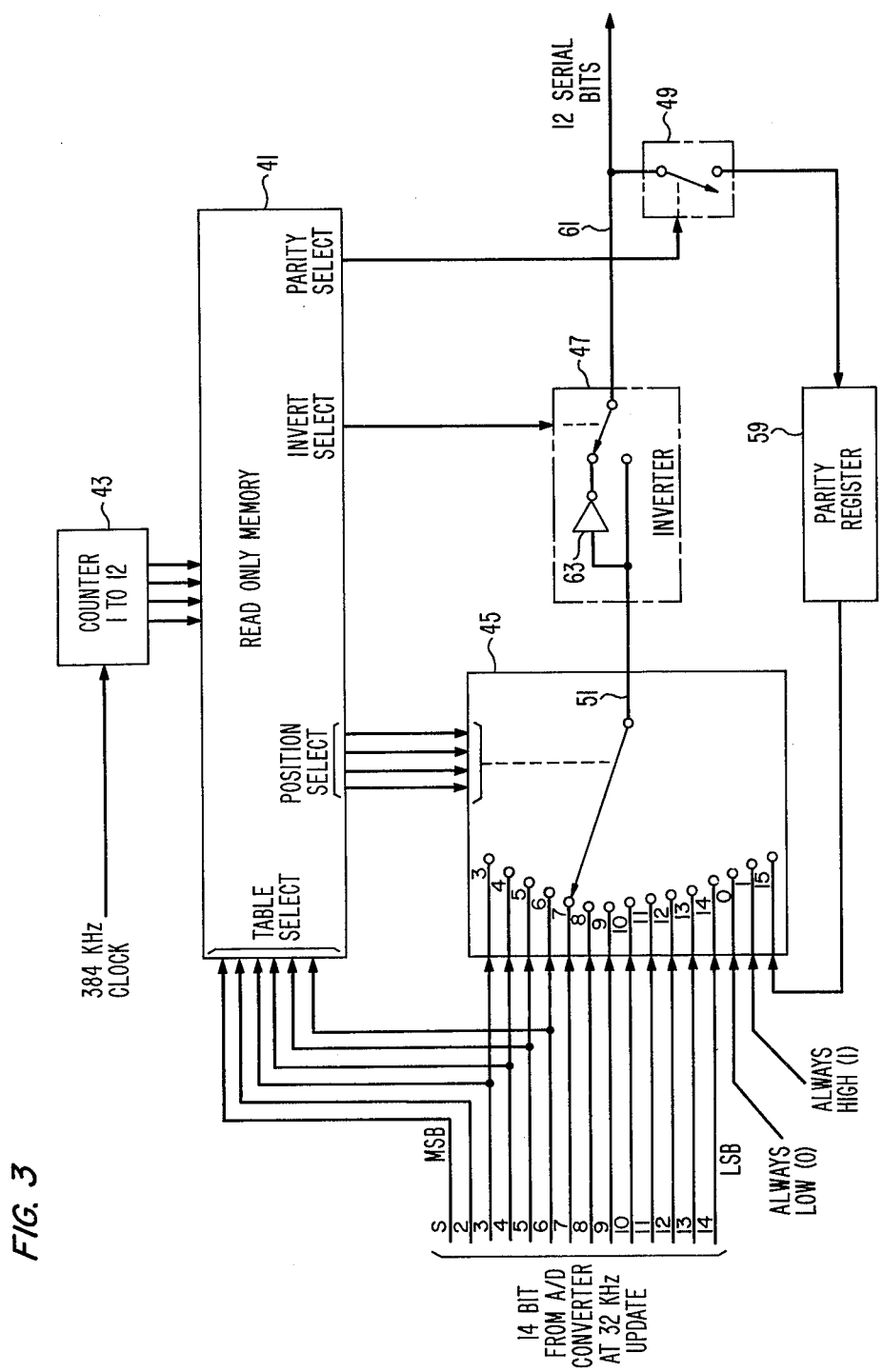
FIG. 3 is a functional block diagram of a code translator useful in practicing the invention.

The digital code translator, shown in functional block diagram form in FIG. 3, performs the functions of block 24 of FIG. 1 while performing the bit order rearrangement according to the current invention. In FIG. 3 a read-only memory (ROM) 41 is addressed by the six most significant bits of the 14-bit linear code word from converter 22. At each of the sixty-four possible table select addresses of memory 41 is stored a table of twelve instruction words. A 1 to 12 counter 43 selects the twelve table entries in order, under control of a 384 kHz clock, which in turn is derived from the 1.544 MHz T1 timing. The table of twelve stored instruction words is therefore read out in order in response to each 14-bit input word representative of a single analog sample. Four bits of each output word of memory 41 address a bit selection switch 45; one bit addresses an inverter switch 47, and one bit addresses a parity switch 49. Bit selection switch 45 operates to selectively connect its output 51 to one of its inputs 0 through 15 under control of each output instruction word from memory 41. The inputs of switch 45 include the third through fourteenth bits of the linear code word from converter 22, an always low (zero) input 0, an always high (1) input 1 and the output 15 of a parity register 59. Inverter switch 47 selectively connects bit selector output 51 to code converter output 61 directly, or alternatively through an inverter 63. Parity switch 49 selectively connects code converter output 61 to the input of a parity register 59. In response to each 14-bit encoded sample input, therefore, ROM 41 utters twelve instruction words of six bits each. Each instruction word determines one output bit of the 12-bit compressed output word, whether that bit is inverted, and whether it is included in the parity check.

The ability to invert any bit is useful in certain kinds of code conversion. If the digital input to code converter 24, for example, is in offset-binary form, the most negative analog value has been encoded as all zeros and the most positive value as all 1's. Translating this to a sign-magnitude compressed code requires that the most significant bit be inverted to form the conventional sign bit. In addition, step bits must be inverted for negative signal samples to reflect negative increments from zero instead of positive increments. Chord bits, of course, are not inverted.

The parity check gives enough information to detect that one bit in a word is in error, but not enough information to determine which bit. The receiver, therefore, cannot correct the error but merely rejects the whole word representing one analog sample. If there is valid change in a more significant bit, therefore, and an error in a less significant bit, ignoring the entire word introduces a greater error than using it. It is useful, therefore, to take parity over only the most significant bits, ignoring the least significant.

In accordance with the bit order shown in FIG. 2, the first instruction word instructs switch 45 to select the sign bit S by connecting its output 51 to either input 0 or 1. It also instructs inverter switch 47 to connect input 51 directly to output 61, bypassing inverter 63, and switch 49 to connect parity register 59 to output 61 so that the sign bit is included in the parity check. In a similar manner, the second instruction word selects bit F. For this bit, output 51 is connected to inputs 8 through 13, depending upon the values of inputs S through 6, according to the Gaunt-Giammusso compression characteristic. If the input sign bit is zero, indicating in offset binary code a negative sample, the F bit is inverted by switch 47, and the parity switch 49 is open. Chord bits X, Y and Z are selected by the seventh, eighth and fifth instruction words, respectively, from inputs 0 and 1. In a notable exception, stored in the table select addresses 100000 and 011111, which represent the smallest magnitude signals in offset-binary code, the fifth instruction word selects chord bit Z by connecting selector output 51 to input 7. This results in the proper chord, but saves half of the memory space. It is possible because the two least significant chords are co-linear. Table 2 illustrates the twelve instruction words that may be stored at table select address 100000 implementing this compression. It can readily be seen that no bits are inverted, that parity is taken over bits S X Y Z A B C P only, and that the Z bit is chosen from input 7. Including the parity bit in the calculation serves to reset it for the next sample. To complete the picture, Table 3 illustrates the instruction words stored at ROM address 010101 (in offset binary code) implementing a chord in the third quadrant. It can be seen that the least significant bit G of the output word is the tenth bit of the input word, that the seven step bits are inverted, and that, again, parity is taken over bits S X Y Z A B C P.

Figure 4:
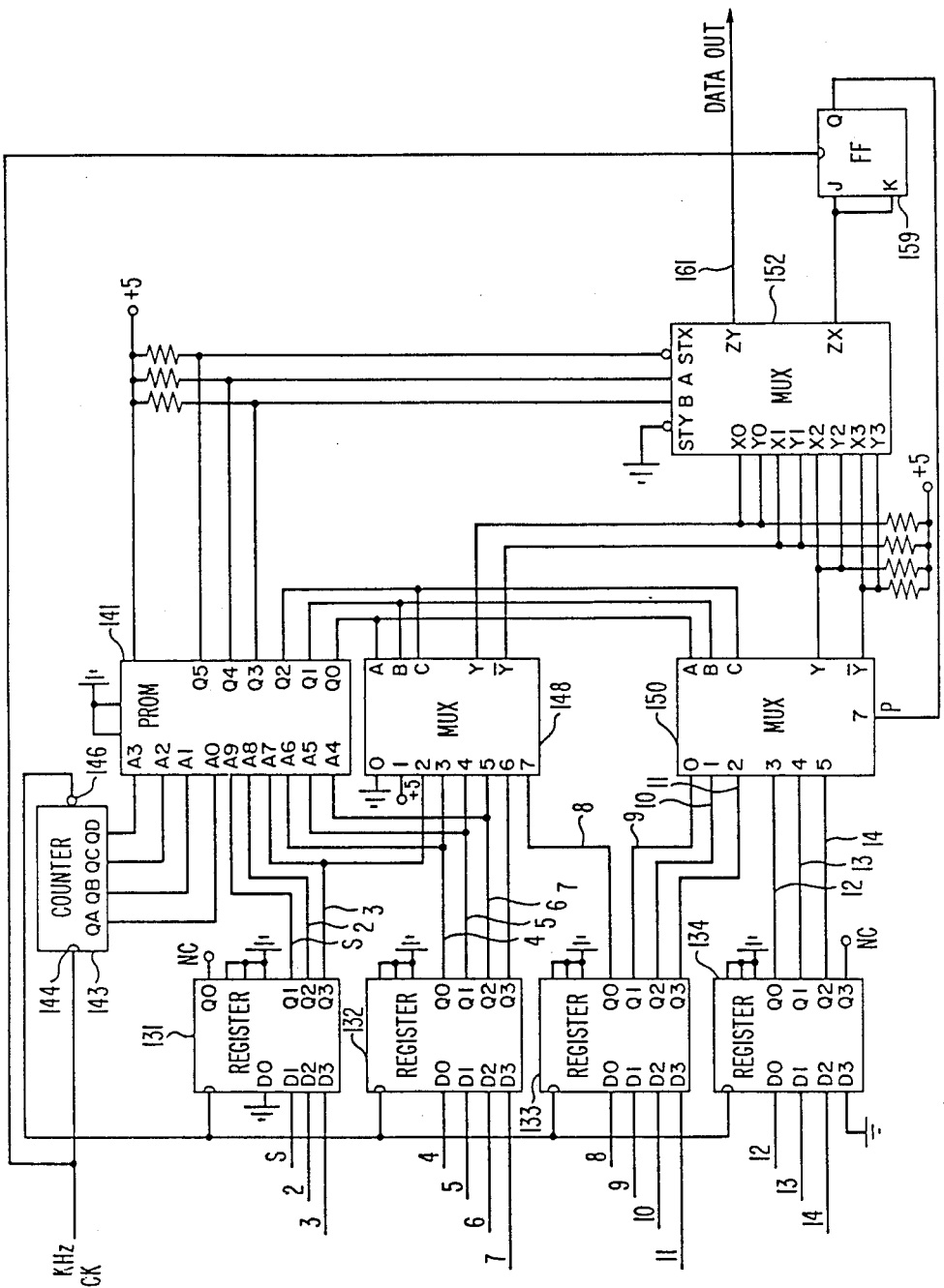
FIG. 4 is a schematic diagram of an embodiment of the translator of FIG. 3 using available hardware.

FIG. 4 is a schematic diagram illustrating a specific implementation of the code translator of FIG. 3 utilizing commercially available integrated circuits. In this circuit, four 4-bit registers 131, 132, 133, and 134, respectively, each have four input leads D0 through D3, four output leads, Q0 through Q3, and a clock input. The fourteen parallel outputs S through 14 from the analog-to-digital converter are connected to the D0 through D3 inputs of the four registers. Input D0 of register 131 may be connected to ground, for example, with the sign bit S connected to input D1, etc., and input D3 of register 134 may

TABLE 2

| | INSTRUCTION WORDS STORED AT ROM ADDRESS 100000 | | | |
|---|---|---|---|---|
| | | | OUTPUT | |
| BIT | INPUT SELECT | ROM SELECT | INV | P |
| S | 0 | 0000 | 0 | 0 |
| F | 13 | 1101 | 0 | 1 |
| A | 8 | 1000 | 0 | 0 |
| B | 9 | 1001 | 0 | 0 |
| Z | 7 | 0111 | 0 | 0 |
| E | 12 | 1100 | 0 | 1 |
| X | 0 | 0000 | 0 | 0 |

TABLE 2-continued

INSTRUCTION WORDS STORED AT ROM ADDRESS 100000

| BIT | INPUT SELECT | ROM SELECT | OUTPUT INV | P |
|---|---|---|---|---|
| Y | 0 | 0000 | 0 | 0 |
| C | 10 | 1010 | 0 | 0 |
| G | 14 | 1110 | 0 | 1 |
| D | 11 | 1011 | 0 | 1 |
| P | 15 | 1111 | 0 | 0 |

TABLE 3

INSTRUCTION WORDS STORED AT ROM ADDRESS 010101

| BIT | INPUT SELECT | ROM SELECT | OUTPUT INV | P |
|---|---|---|---|---|
| S | 1 | 0001 | 0 | 0 |
| F | 9 | 1001 | 1 | 1 |
| A | 4 | 0100 | 1 | 0 |
| B | 5 | 0101 | 1 | 0 |
| Z | 1 | 0001 | 0 | 0 |
| E | 8 | 1000 | 1 | 1 |
| X | 1 | 0001 | 0 | 0 |
| Y | 0 | 0000 | 0 | 0 |
| C | 6 | 0110 | 1 | 0 |
| G | 10 | 1010 | 1 | 1 |
| D | 7 | 0111 | 1 | 1 |
| P | 15 | 1111 | 0 | 0 | also be grounded. A 1 to 12 counter 143 has one input 144 connected to the 384 kHz clock signal, four outputs, QA, QB, QC and QD, upon which appear the combinational logic that counts from 1 to 12, and a carry output 146. A programmable read-only memory (PROM) 141 has ten address inputs A0 through A9 and six outputs Q0 through Q5. Address inputs A0 through A3 are connected to counter 143 outputs QA through QD, respectively. Address inputs A9, A8 and A7 are connected to register 131 outputs Q1, Q2 and Q3, respectively, and address inputs A6, A5 and A4 are connected to register 132 outputs Q0, Q1 and Q2, respectively. Counter carry output 146 is connected to the clock inputs of registers 131 through 134. Two 8 to 1 multiplexers 148 and 150, each have eight signal inputs 0 through 7, and three instruction inputs A, B and C, and two outputs, Y and $\overline{Y}$. Signal input 1 of multiplexer 148 is connected to the +5 volt source. Input 0 is connected to ground, and input 2 is connected to output Q3 of register 131. Inputs 3, 4, 5 and 6 of multiplexer 148 are connected to outputs Q0 through Q3, respectively of register 132, and input 7 is connected to output Q0 of register 133. Inputs 0, 1 and 2 of multiplexer 150 are connected to outputs Q1, Q2, and Q3, respectively of register 133, and inputs 3, 4, 5 of multiplexer 150 are connected to outputs Q0, Q1 and Q2, respectively, of register 134. Instruction inputs A, B and C of both multiplexers 148 and 150 are connected to outputs Q0, Q1 and Q2, respectively, of PROM 141. A dual 4 to 1 multiplexer 152 has signal inputs X0, Y0, X1, Y1, X2, Y2, X3 and Y3, and instruction inputs A, B, STX and STY. Multiplexer 152 also has two outputs, ZY and ZX. Instruction inputs A and B of multiplexer 152 are connected to outputs Q4 and Q3, respectively, of PROM 141. Input STY is connected to ground, and input STX is connected to output Q5 of PROM 141. Signal inputs X0 and Y0 are connected to output Y of multiplexer 148, and signal inputs X1 and Y1 are connected to output $\overline{Y}$ of multiplexer 148. Similarly, signal inputs X2 and Y2 and X3 and Y3 are connected to multiplexer 150 outputs Y and $\overline{Y}$, respectively. Finally, the code translator of FIG. 4 includes a JK flip-flop 159 which performs as a parity register. Output ZX of multiplexer 152 is connected to the J and K inputs of flip-flop 159, the Q output is connected to input 7 of multiplexer 150, and the clock input is connected to the 384 kHz clock signal.

In this specific implementation, registers 131 through 134 may be 4-bit registers in CMOS, supplied for example by Motorola under the code MC14076. PROM 141 may be 1KX8 capacity manufactured by Intel in NMOS under the code 2708. Multiplexers 148 and 150 can be purchased in TTL logic from T.I., coded 74LS151, and multiplexer 152 may be Motorola's dual 4-1 multiplexer MC14539 manufactured in CMOS. Counter 143 can utilize the commonly available chip 74LS161 in TTL logic. While this chip is capable of counting to 16, it is easily wired by those skilled in the art to count to 12.

Since multiplexer 152 is implemented in CMOS technology, its inputs that interface with NMOS (PROM 141) and TTL (multiplexers 148 and 150) are connected to the +5 volt source through 10K pull up resistors.

This circuit operates as follows: The four input registers 131 through 134 operate as a latch to hold in parallel form the 14-bit input words from the linear A to D converter. The first six bits, S through 6, form part of the address of PROM 141, the output of counter 143 forms the remainder of the address. The address bits, therefore, on A0 through A3, step through 12 changes at the 384 kHz rate, while those on leads A4 through A9 remain constant. The carry signal from counter 143 updates the 14-bit word as the counter resets. Twelve instruction words are therefore read out of PROM 141 on leads Q0 through Q5 for each input 14-bit word.

The outputs Y and $\overline{Y}$ of the multiplexers 148 and 150 are connected to specific inputs 0 through 7 according to the logic on the inputs A, B and C, that is, the first three bits of each instruction word stored in PROM 141. $\overline{Y}$, of course, is the inverse of Y.

The chip chosen for multiplexer 152 operates in this manner: When inputs STX AND STY are low, outputs ZX and ZY are connected to the particular respective X and Y inputs indicated by the logic on inputs A and B. With input STY grounded, therefore, output ZY is always connected to a selected Y input, Y0 through Y3. Output ZX is connected to the selected X input only when a 0 appears on STX. Thus, the first five bits of each instruction word chose a particular output bit and whether or not it is inverted. The sixth bit determines whether it is to be included in parity. The output Q of flip-flop 159 changes state with every "1" from output ZX of multiplexer 152. It forms the parity bit, which is the last bit of each 12-bit word fed out of output 161. It will be obvious that the order of the output bits, as well as the compression characteristic can readily be changed by changing the instruction words stored in PROM 141.

Hence placement of the least significant bits of this program signal in the second bit positions of the T1 time slots according to the invention is controlled by the contents of the memory.

While a whole code translator has been disclosed as the best contemplated method of practicing the invention, as previously mentioned simple wiring between respective bit positions of registers can also be used. Still other methods can be devised by those of ordinary skill in the art without departing from the principles and scope of the invention.

I claim:

1. An arrangement for transmitting a broadband signal over a multiplexed pulse code modulated (PCM) transmission system having 8-bit time slots comprising:
   encoding means for transforming said broadband signal into PCM words of n-bits each,
   inserting means for inserting m of said n-bit words into p of said 8-bit time slots wherein m, n and p are integers and mn=8p
   characterized in that
   said arrangement further comprises bit order arranging means for arranging the bit order of said n-bit words so that the second bit positions of said p 8-bit time slots are occupied only by the p least significant bits of said n-bit words.

2. An arrangement as in claim 1 wherein n is 12 and p is 3, and said bit order arranging means places the three least significant bits in the second, sixth and tenth bit positions of said 12-bit words.

* * * * *